United States Patent [19]

Ueda

[11] Patent Number: 4,769,735

[45] Date of Patent: Sep. 6, 1988

[54] INVERSE-TIME RELAY

[75] Inventor: Toyoki Ueda, Hyogo, Japan

[73] Assignee: Mitsubishi Denki Kabushiki Kaisha, Tokyo, Japan

[21] Appl. No.: 886,230

[22] Filed: Jul. 16, 1986

[51] Int. Cl.$^4$ ............................................. H02H 3/093
[52] U.S. Cl. ......................................... 361/94; 361/97; 364/483
[58] Field of Search ..................... 361/87, 93, 94, 95, 361/96, 97; 364/483; 340/347 AD

[56] References Cited

U.S. PATENT DOCUMENTS

| | | | |
|---|---|---|---|
| 4,297,741 | 10/1981 | Howell | 361/96 X |
| 4,347,541 | 8/1982 | Chen et al. | 361/97 X |
| 4,351,012 | 9/1982 | Elms et al. | 361/97 X |
| 4,377,836 | 3/1983 | Elms et al. | 361/96 |
| 4,470,092 | 9/1984 | Lombardi | 361/23 |
| 4,682,264 | 7/1987 | Demeyer | 361/97 X |

FOREIGN PATENT DOCUMENTS 0193447  9/1986  European Pat. Off. .
2073969 10/1981 United Kingdom .

OTHER PUBLICATIONS

"Direct Digital-to-Analog Values Storage", by Beck, IBM Tech. Disclosure Bulletin, vol. 9, No. 4, 9-1966.
Taiwa Denki Kogyo Kabushiki Kaisha, "Static-Type Overvoltage Relay", Oct. 5, 1982, pp. 1-6.

Primary Examiner—G. P. Tolin
Assistant Examiner—Derek S. Jennings
Attorney, Agent, or Firm—Bernard, Rothwell & Brown

[57] ABSTRACT

An inverse-time relay is disclosed which comprises a voltage dividing circuit for dividing a d.c. voltage proportional to a current value in a line to be protected by a plurality of ratios different from one another thereby to provide a plurality of voltage values, a voltage saturating circuit for saturating each of the divided voltage values at a predetermined value, and a microcomputer for achieving an inverse-time operation employing the plurality of voltage values obtained from the voltage dividing circuit. The microcomputer makes comparison between each of the plurality of the voltage values obtained from the voltage dividing circuit and the saturation voltage as to whether or not the former is smaller than the latter, and, for the divided voltage smaller in magnitude than the saturation voltage, counts the operating time corresponding to that voltage and delivers a decision output when the count has reached the operating time.

2 Claims, 3 Drawing Sheets

INVERSE-TIME RELAY

BACKGROUND OF THE INVENTION

1. Field of the Invention

The present invention relates to an inverse-time relay for use in protection of power transmission and distribution lines.

2. Description of the Prior Art

FIG. 4 is a circuit diagram of input circuit portion for showing a prior art inverse-time relay, in which 1 denotes a current transformer outputting secondary current proportional to the current in the line to be protected, 2 denotes a rectifying-smoothing-settling portion for current transformation, current-voltage conversion, rectification and smoothing of the output current from the current transformer 1, 3 denotes level detection portion for detecting whether or not the output voltage value from the rectifying-smoothing-settling portion 2 is in excess of a specified detection level, 4 denotes an operating-time timer of the inverse time type for producing a timing output after a delay which varies inversely with input current, 5 denotes a control power source for the electronic circuit, and 6 denotes a switch for supplying the operating-time timer 4 with an input voltage in response to the level detection output from the level detection portion 3.

Operations of the relay will be described in the following. First, the current input from the secondary side of the current transformer 1 is transformed into a suitable current value by the rectifying-smoothings-settling portion 2, and then, converted by current-voltage conversion into an a.c. voltage of the magnitude corresponding to the tap setting. The a.c. voltage is rectified and smoothed into a d.c. voltage Vi. Since d.c. voltage Vi is proportional to the input current, it will be referred to as "input voltage Vi" in this specification. This voltage Vi is compared with a reference voltage in the level detection portion 3 and a decision of level as to whether or not it is higher than the reference voltage is made therein. When the input voltage exceeds the reference voltage, the switch 6 is turned ON, whereby the input voltage Vi is applied to the operating-time timer 4. The operating-time timer 4 exhibits the inverse-time characteristic to vary the operating time according to the magnitude of the input voltage Vi and operates so as to deliver a decision output when a predetermined operating time has elapsed.

In the inverse-time relay of the prior art, as described above, the range within which the magnitude of the current input could correctly be detected was up to an input voltage Vi not exceeding the power source voltage, and so, it was unable to enlarge the dynamic range. Hence, in an overcurrent relay exhibiting an inverse-time characteristic responding to detected magnitude of the input, for example, because of the small dynamic range for the input, the operating time was saturated as indicated in FIG. 5 by the curve T1 when the input current value exceeded a certain point. Thus, there was such a problem in the prior art that the desired operating-time characteristic as indicated by the curve T2 was unable to be provided.

SUMMARY OF THE INVENTION

A primary object of the present invention is the provision of an inverse-time relay in which it is easy to change the dynamic range for the input current value proportional to the value of the current in a line to be protected.

In one aspect of the present invention, an inverse-time relay comprises a current transformer for outputting a secondary current proportional to the current in the line to be protected, a rectifying-smoothing-settling portion for, first, converting the secondary current output from the current transformer into a voltage output and, then, rectifying and smoothing the same thereby to produce an input voltage proportional to the secondary current, a voltage dividing circuit for dividing the input voltage by voltage dividing ratios different from one another thereby to produce a plurality of voltages, a voltage limiting circuit for limiting each of the divided voltage values at a predetermined value, and a microcomputer selecting any one of the voltages obtained by division of the voltage which corresponds to the secondary current output, comparing the selected voltage with a reference voltage, selecting, when the above selected voltage is larger than the reference voltage, the other divided voltages in succession, obtaining, by calculation, when any of the selected voltage values is smaller than the reference value, the current value from this voltage value, counting the inverse-time operating time corresponding to the obtained current value, and delivering a decision output when the count has reached the operating time.

According to the present invention, it is possible to change the dynamic range for the input current values according to the need, and so, the selective setting of the operating time corresponding to the input current values can be freely selected.

Further, for the current range in the vicinity of 100% input current, the accuracy of the operating time can be improved by selecting the divided voltage exhibiting a large rise.

DETAILED DESCRIPTION OF THE PREFERRED EMBODIMENT

Figure 1:
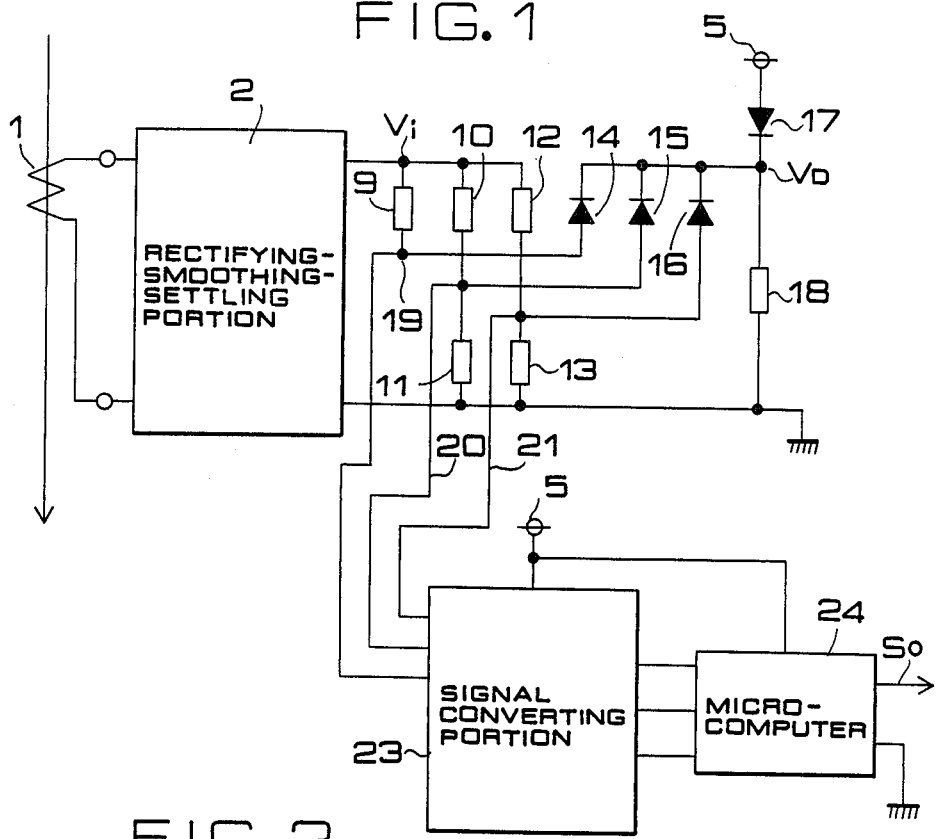
FIG. 1 is a block diagram showing an inverse-time relay according to the invention.

Referring to FIG. 1, reference numerals 1 and 2 denote a current transformer and a rectifying-smoothing-settling portion, respectively, the same as in the previous description. Reference numerals 9, 10, 11, 12, and 13 denote voltage dividing resistors for dividing the input voltage Vi into a plurality of kinds of voltages, namely, by the voltage dividing resistor 9 is obtained the voltage characteristic as indicated by the curve A in FIG. 2, by the voltage dividing resistors 10, 11 is obtained the voltage characteristic as indicated by the curve B in FIG. 2, and by the voltage dividing resistors 12, 13 is obtained the voltage characteristic as indicated by the curve C in FIG. 2. Numerals 14, 15, 16, and 17 denote diodes and 18 denotes a resistor, which function so that the voltages A, B, and C obtained by the voltage division will not exceed a saturation voltage value E.

Numeral 23 denotes a signal converting portion including a multiplexer for selecting the voltages A, B, C and an A/D converter converting the voltage into digital values and 24 denotes a microcomputer making a decision on a level and counting of an inverse-time timer.

Operation of the above-mentioned apparatus will be described in the following.

Figure 2:
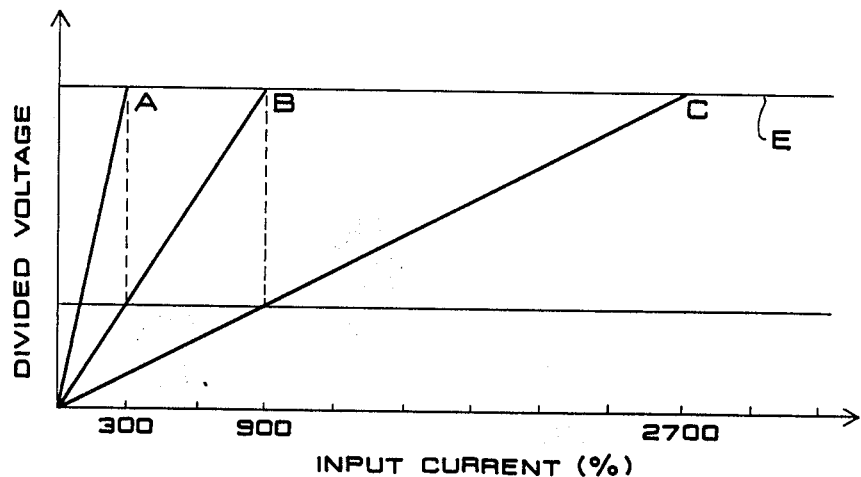
FIG. 2 is a graph showing relations between input currents and divided voltages in the apparatus of FIG. 1.

First, the current input as the secondary current of the current transformer 1 is converted in the rectifying-smoothing-settling portion 2 into the input voltage Vi. Then, this input voltage Vi is divided at dividing ratios different from one another so that the voltages A, B, C as shown in FIG. 2 are obtained. In this embodiment, it is assumed that the voltage A is equal to the input voltage Vi and has a linear characteristic against 0-300% of the input currents. The voltage B is the voltage divided into ⅓ of the input voltage Vi by means of the resistors 10 and 11 and has a linear characteristic against 0-900% of the input currents. The voltage C is the voltage divided into 1/9 of the input voltage Vi and has a linear characteristic against 0-2700% of the input currents. If only the voltage C is taken up, it appears as if 0-2700% of dynamic range is obtainable. However, when 100% of the operating current (input current) is input, the voltage value will become very small and the error in the operating time in the event of such an operating value and small current input will become very large, and so, the apparatus will be unusable as a protective relay. Therefore, in practice, it is arranged such that the voltages A, B, and C are selected for different ranges of currents, namely, the voltage A is selected for 0-300%, the voltage B selected for 300-900%, and the voltage C selected for 900-2700%. By so doing, a large dynamic range is made obtainable with small error produced.

Accordingly, as also apparent from FIG. 2, the dynamic range can be increased to any extent by changing the voltage dividing ratio of each set of resistors or increasing the number of sets of the voltage dividing resistors. Thus, any required dynamic range can be readily obtained.

Now, the operation for controlling the divided voltages A, B, C so as not to exceed the power source voltage of the control power source will be described. Referring to FIG. 1, it is adapted, by means of the diode 17 and the resistor 18, such that the voltage VD is of the voltage value of the power source 5 less the forward voltage drop in the diode 17. Since the voltages A, B, and C are connected with the junction point of the diode 17 and the resistor 18 through the diodes 14, 15, and 16, respectively, the diode 14, 15, or, 16,is rendered conductive if forward voltage of the diodes 14, 15, or 16 becomes larger than the protection voltage $V_D$. Since the diode 14, 15, and 16 have virtually the same characteristic as the diode 17, their forward voltages are virtually the same. As the result, if the voltage A, B, or C exceeds the power source voltage 5, the diode 14, 15, or 16 connected therewith is rendered conductive. In the described manner, these voltages are controlled not to exceed the fixed power source voltage.

Figure 3:
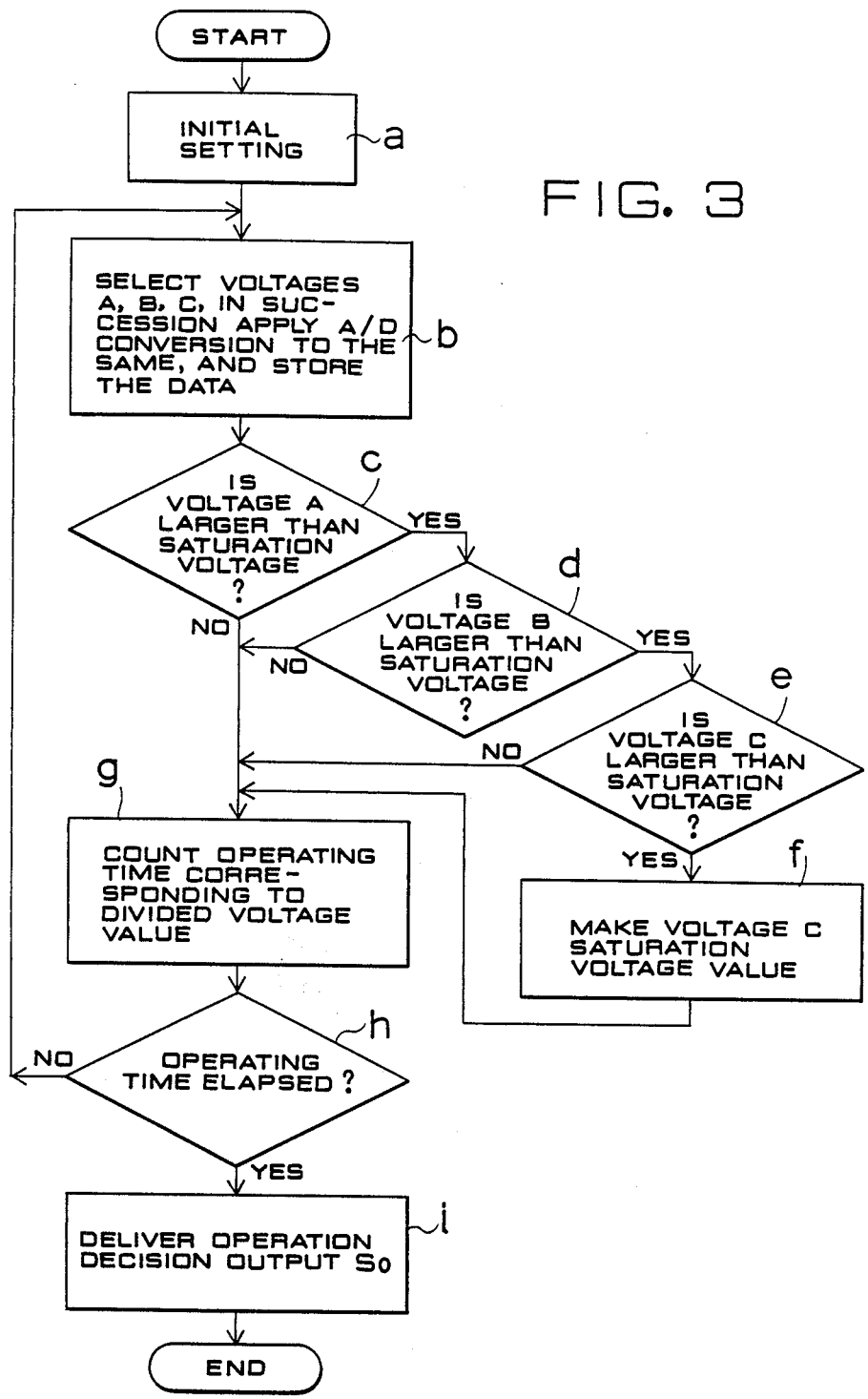
FIG. 3 is an operational flow chart of the microcomputer in the apparatus of FIG. 1.
Figure 4:
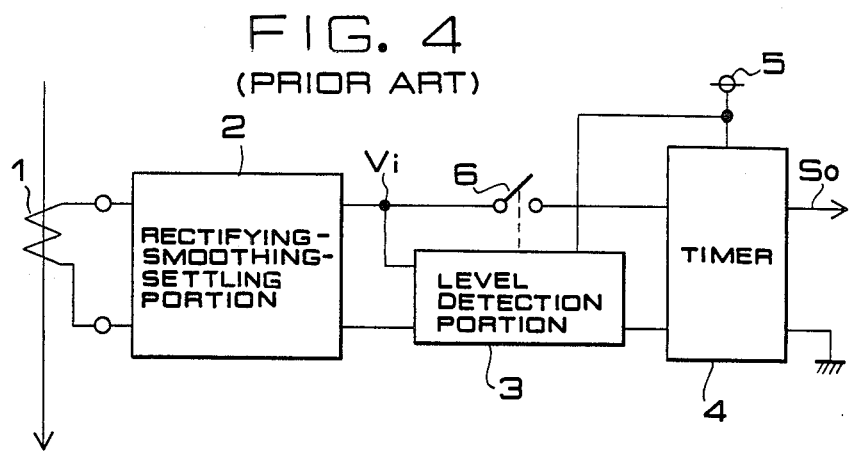
FIG. 4 is a block diagram showing a prior art inverse-time relay.
Figure 5:
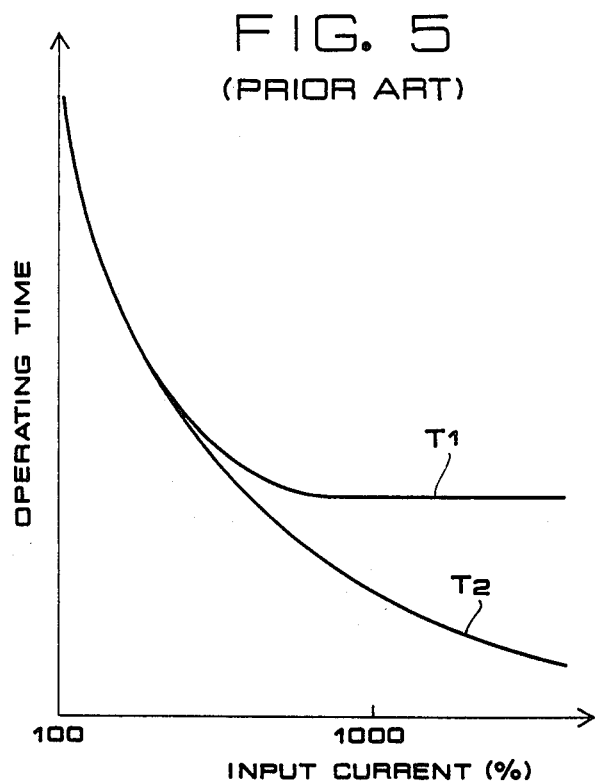
FIG. 5 is a graph slowing an inverse-time characteristic prior art inverse-time relay of FIG. 4

Below will be given the description how the succeeding process is advanced using the divided voltage. To begin with, the voltages A, B, C are selected one by one by the multiplexer in the signal converting portion 23. The selected value is then converted into a digital value in the A/D converter and read in by the microcomputer 24. Thereafter, the value of the voltage A corresponding to the input current within the range of 0-300% is first compared with the reference voltage stored in the memory in advance, namely, the above described saturation voltage E. If the value of the voltage A is determined to be in excess of the reference voltage value, the counter means of the microcomputer starts counting the operating time. Which divided voltage is to be used is decided by the microcomputer 24 and the one corresponding to the actual input current is used. To be concrete, the voltages are compared in magnitude with the saturation voltage E one by one from the voltage A for the smallest input current in ascending order of the input current value corresponding thereto. If the voltage A is not smaller than the saturation voltage, it is judged to have been saturated and the next voltage B is compared in like manner. If any voltage is smaller, the input current is obtained by calculation from the examined voltage and the inverse-time operating time corresponding thereto is counted. And when the count has reached the operating time, a decision output $S_0$ is output. The details of the above mentioned process in the microcomputer 24 will be described below with reference to the flow chart of FIG. 3.

Thus, as initial setting, the input current values as parameters for conditions for starting the count of the operating time, the saturation voltage E, and so on are stored in a ROM in advance (step a), and then the data of the voltages A, B, C selected by the multiplexer and converted by the A/D converter are stored in a RAM (step b). Then, it is decided whether the voltage A is in excess of the saturation voltage E or not (step c). If it is decided to be in excess, the voltage B is examined whether the same is in excess of the saturation voltage E or not (step d), and if it is decided to be in excess, the next voltage C is examined whether or not the same is in excess of the saturation voltage E (step e). If it is decided to be in excess, the voltage C is regarded as the saturation voltage (step f), and the operating time corresponding to the voltage C is counted (step g), and when it is decided that the operating time has elapsed (step h), the operation decision output $S_O$ is output (step i). Until an operating time has elapsed, the processes in the step b and the steps succeeding thereto are repeated. And, if, in the step c, d, or e, the voltage A, B, or C is decided not to be in excess of the saturation voltage E, then the processes in the step g and the steps succeeding thereto are directly performed.

According to the present invention as described so far, the input voltage produced by conversion of the secondary current of the current transformer is divided into a plurality of different voltages and each of the divided voltages is decided as to whether or not the same is in excess of the saturation voltage, and, according to this decision, the operating time corresponding to the divided voltage is subjected to measurement. Therefore, such effects are obtained that the dynamic range for the input currents can be freely selected, and it can be made large enough to meet the need, and the setting of the operating time corresponding to the input current can be freely selected. And, in the vicinity of 100% of the input current, the operating time can be provided with precision by selecting the divided voltage exhibiting a high rise.

What is claimed is:

1. An inverse-time relay comprising:
   a current transformer for outputting a secondary current proportional to the current in a line to be protected;
   a rectifying-smoothing-settling portion for, first, converting the secondary current output from said current transformer into a voltage output and, then, rectifying and smoothing the same thereby to produce an input voltage proportional to the secondary current;

a voltage dividing circuit including a plurality of dividing resistor arrays having voltage dividing ratios different from one another for dividing said input voltage to produce a plurality of voltages;

a voltage limiting circuit including a plurality of diodes connected to said voltage dividing resistor arrays, respectively, for limiting each of said divided voltage values at a predetermined value; and a microcomputer selecting any one of said voltages obtained by division of the voltage which corresponds to said secondary current output, comparing the selected voltage with a reference voltage one by one from the voltage value for the smallest input current in ascending order of said input current value corresponding thereto, selecting, when the above selected voltage value in larger than the reference voltage, said other divided voltages in succession, obtaining by calculation, when any of said selected voltage values is smaller than said reference value, the current value from this voltage value, counting the inverse-time operating time corresponding to the obtained current value, and delivering a decision output when the count has reached the operating time.

2. An inverse-time relay according to claim 1 wherein said plurality of dividing resistor arrays include two dividing resistor arrays having respective dividing ratios of one-third and one-ninth, said voltage dividing circuit includes a resistor for passing the smallest voltage to the microcomputer.

* * * * *

UNITED STATES PATENT AND TRADEMARK OFFICE
CERTIFICATE OF CORRECTION

PATENT NO. : 4,769,735

DATED : September 6, 1988

INVENTOR(S) : Toyoki Ueda

It is certified that error appears in the above-identified patent and that said Letters Patent is hereby corrected as shown below:

Column 1, line 40, delete "of level".

Column 2, line 48, "slowing" should be --showing--.

Column 6, line 2, "in" should be --is--.

Signed and Sealed this

Fourth Day of April, 1989

Attest:

DONALD J. QUIGG

*Attesting Officer*  *Commissioner of Patents and Trademarks*